(12) United States Patent
Mylavarapu

(10) Patent No.: US 8,392,651 B2
(45) Date of Patent: Mar. 5, 2013

(54) DATA CACHE WAY PREDICTION

(75) Inventor: Ajit Karthik Mylavarapu, Mountain View, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 685 days.

(21) Appl. No.: 12/194,936

(22) Filed: Aug. 20, 2008

(65) Prior Publication Data

US 2010/0049912 A1 Feb. 25, 2010

(51) Int. Cl.
*G06F 12/00* (2006.01)
*G06F 13/00* (2006.01)
*G06F 13/28* (2006.01)

(52) U.S. Cl. ............... 711/108; 711/128; 711/E12.018; 711/E12.069; 711/E12.083

(58) Field of Classification Search ............... 711/128, 711/108, E12.018, E12.069, E12.083
See application file for complete search history.

(56) References Cited

U.S. PATENT DOCUMENTS

| | | | |
|---|---|---|---|
| 5,359,723 A | 10/1994 | Mathews et al. | |
| 5,406,504 A | 4/1995 | Denisco et al. | |
| 5,752,069 A * | 5/1998 | Roberts et al. | 712/23 |
| 5,764,946 A * | 6/1998 | Tran et al. | 712/239 |
| 5,768,610 A * | 6/1998 | Pflum | 712/23 |
| 5,832,297 A * | 11/1998 | Ramagopal et al. | 710/5 |
| 5,848,433 A * | 12/1998 | Tran et al. | 711/137 |
| 5,860,104 A * | 1/1999 | Witt et al. | 711/137 |
| 5,887,152 A * | 3/1999 | Tran | 712/217 |
| 5,895,490 A * | 4/1999 | Ramsey | 711/144 |
| 6,073,230 A * | 6/2000 | Pickett et al. | 712/205 |
| 6,101,595 A * | 8/2000 | Pickett et al. | 712/205 |
| 6,189,068 B1 * | 2/2001 | Witt et al. | 711/3 |
| 6,223,255 B1 | 4/2001 | Argade | |
| 6,286,082 B1 | 9/2001 | Moudgal et al. | |
| 6,393,549 B1 * | 5/2002 | Tran et al. | 712/204 |
| 6,581,140 B1 * | 6/2003 | Sullivan et al. | 711/128 |
| 6,604,190 B1 * | 8/2003 | Tran | 712/207 |
| 7,310,712 B1 | 12/2007 | Gordon | |
| 7,406,569 B2 | 7/2008 | Van de Waerdt | |
| 7,430,642 B2 | 9/2008 | Moyer | |
| 7,681,020 B2 | 3/2010 | Kriegel et al. | |
| 7,853,755 B1 | 12/2010 | Agarwal et al. | |
| 7,856,532 B2 | 12/2010 | Lataille et al. | |
| 7,856,576 B2 | 12/2010 | Henrion et al. | |
| 2003/0200404 A1 | 10/2003 | Wicki et al. | |
| 2004/0215882 A1 * | 10/2004 | Alexander et al. | 711/128 |
| 2005/0050278 A1 * | 3/2005 | Meier et al. | 711/128 |
| 2008/0082721 A1 * | 4/2008 | Yu et al. | 711/3 |

(Continued)

OTHER PUBLICATIONS

Non-Final Office Action for U.S. Appl. No. 12/195,053, mailed on Feb. 7, 2011, 13 pages.
Final Office Action for U.S. Appl. No. 12/195,053, mailed on Oct. 19, 2011, 14 pages.

*Primary Examiner* — Sheng-Jen Tsai

(74) *Attorney, Agent, or Firm* — Kilpatrick Townsend & Stockton LLP; Ardeshir Tabibi

(57) ABSTRACT

A microprocessor includes one or more N-way caches and a way prediction logic that selectively enables and disables the cache ways so as to reduce the power consumption. The way prediction logic receives an address and predicts in which one of the cache ways the data associated with the address is likely to be stored. The way prediction logic causes an enabling signal to be supplied only to the way predicted to contain the requested data. The remaining (N−1) of the cache ways do not receive the enabling signal. The power consumed by the cache is thus significantly reduced.

24 Claims, 9 Drawing Sheets

U.S. PATENT DOCUMENTS

2008/0082753 A1* 4/2008 Licht et al. .................... 711/128
2009/0213673 A1* 8/2009 Flautner et al. ............... 365/203
2009/0319727 A1* 12/2009 Dhodapkar et al. .......... 711/146
2010/0049953 A1* 2/2010 Mylavarapu et al. ......... 712/225

* cited by examiner

DATA CACHE WAY PREDICTION

CROSS-REFERENCES TO RELATED APPLICATIONS

The present application is related to commonly owned U.S. patent application Ser. No. 12/195,053, entitled "Data Cache Receive Flop Bypass", filed on the same day herewith, the content of which is incorporated herein by reference in its entirety.

BACKGROUND OF THE INVENTION

The present invention relates to microprocessor based systems, and more particularly to reducing power consumption in a microprocessor.

Advances in semiconductor fabrication technology have given rise to considerable increases in clock speeds and significant decreases in die sizes of microprocessor-based System-on-chip (SoC) semiconductors. As a result, heat buildup in SoCs has become a significant problem in the semiconductor industry. There is an industry wide need to find ways to reduce power consumption, especially for SoC semiconductors.

An SoC may include a microprocessor. The load/store unit (LSU) of such a microprocessor is responsible for continually providing data to the execution unit of the microprocessor. To reduce latency, a conventional LSU typically employs one or more levels of high-speed cache memory. While conventional caches work for their intended purpose, they consume a significant portion of the total power used by a microprocessor and generate an undesirable amount of heat. This makes microprocessors having conventional data caches undesirable and/or impractical for many SoC-based applications.

What is needed is a microprocessor with a data cache system that offers the performance advantages of a large low-latency cache but consumes less power.

BRIEF SUMMARY OF THE INVENTION

In accordance with the present invention, components of a cache disposed in a microprocessor are selectively enabled and disabled to reduce the power consumption. In accordance with one embodiment, the cache is an N-way cache, where N is an integer greater. The microprocessor also includes, in part, a way prediction logic configured to receive an address and predict the way in which data associated with the address is likely to have been stored. The way prediction logic causes an enabling signal to be applied only to the predicted. Therefore, the remaining ways do not receive the enabling signal.

In one embodiment, the way prediction logic includes, in part, a way prediction array and a way prediction control unit. The way prediction array includes a multitude of entries each storing data representative of an address identifying a cache entry, data representative of a cache way, and one or more validation bits. The way prediction control unit is configured to compare one or more bits of the received address with one or more bits of each of the addresses stored in the array to detect an address match. The way prediction control unit is configured to generate the enabling signal in accordance with the detected address match and further in accordance with the stored validation bits.

In one embodiment, the way prediction logic updates the way prediction array when a cache hit is detected. In another embodiment, the way prediction logic updates the way prediction array when no match in the addresses is detected. In yet another embodiment, the way prediction logic updates the way prediction array when the addresses are detected as being matched and one or more validation bits associated with the received address indicate that the data stored in the matched cache way is invalid.

In one embodiment, the received address is a virtual address. In one embodiment, the microprocessor includes a multitude of processing cores, each processing core having an N-way cache. In one embodiment, the way prediction array is a Content Addressable Memory (CAM). In one embodiment, the way prediction logic flushes at least one of the address validation bits stored in the CAM during a clock cycle. In another embodiment, the way prediction logic flushes all of the address validation bits stored in the CAM during the same clock cycle. In one embodiment, the N-way cache is a data cache.

In accordance with another embodiment of the present invention, a method of operating a microprocessor having an N-way cache includes, in part, the predicting the cache way in which data associated with a received address is likely to be stored, supplying an enabling signal to the predicted cache ways; and inhibiting the supply of the enabling signal to the remaining (N−1) cache ways.

In one embodiment, the method of operating the microprocessor further includes, in part, storing a multitude of entries each including an address identifying a cache entry, data representative of a cache way, and one or more validation bits; comparing one or more bits of the received address with one or more bits of the stored addresses to detect an address match; and generating the enabling signal in accordance with the detected address match and further in accordance with the stored validation bits.

In one embodiment, at least one of the plurality of entries is updated when a cache hit is detected. In another embodiment, at least one of the entries is updated when no match in the addresses is detected. In yet another embodiment, at least one of the entries is updated when an address match is detected and one or more validation bits associated with the received address indicate that the data stored in the matched cache way is invalid.

In one embodiment, the received address is a virtual address. In another embodiment, the N-way cache is associated with one of a multitude of processing cores disposed in a microprocessor. In one embodiment, the plurality of entries are stored in a Content Addressable Memory (CAM), at least one of the address validation bits of which is flushed during a given clock cycle. In another embodiment, all of the address validation bits stored in the CAM are flushed during the same clock cycle. In one embodiment, the N-way cache is a data cache.

BRIEF DESCRIPTION OF THE DRAWINGS

FIG. 5 is a flow chart of steps used to control the power consumption of the N-way cache shown in FIG. 4a.

DETAILED DESCRIPTION OF THE INVENTION

A microprocessor in accordance with one embodiment of the present invention includes one or more N-way caches, and way prediction logic. The way prediction logic is configured to receive an address and predict in which one of the cache ways the data associated with the address is likely to be stored. The way prediction logic causes an enabling signal to be supplied only to the way predicted to contain the requested data. The remaining (N−1) of the cache ways do not receive the enabling signal. Accordingly, the power consumed by the cache is significantly reduced.

Figure 1:
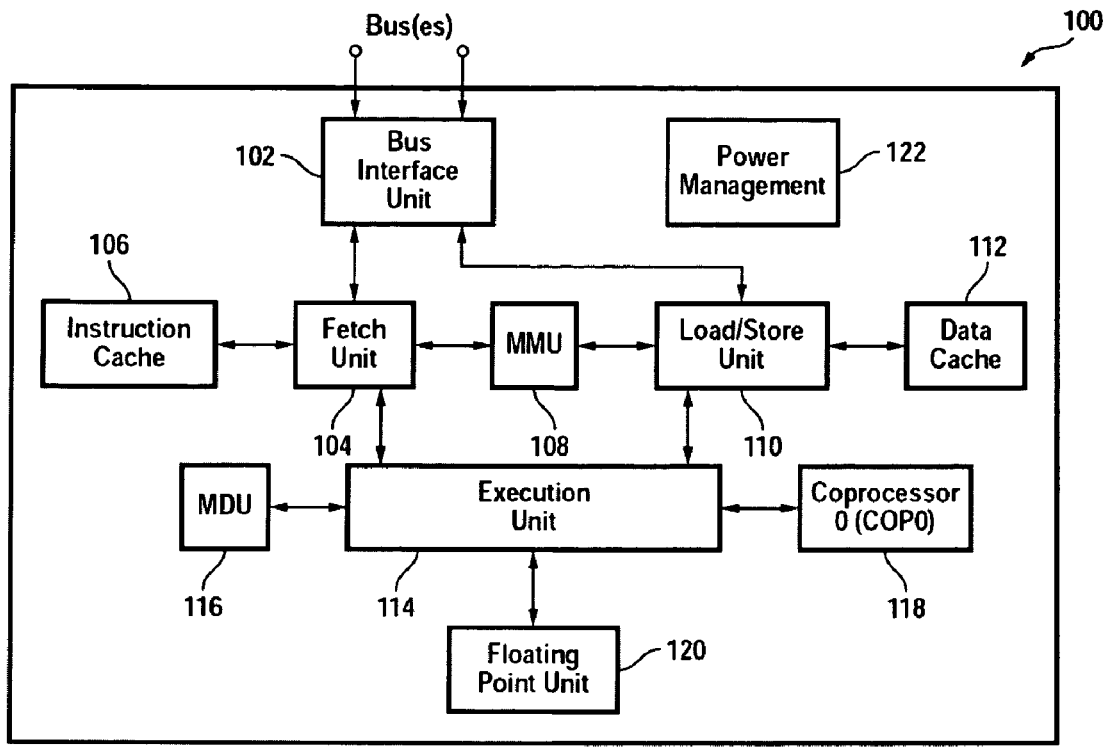
FIG. 1 is a block diagram of a microprocessor core, in accordance with one embodiment of the present invention.

FIG. 1 is a block diagram of a microprocessor core 100, in accordance with one embodiment of the present invention. Microprocessor core 100 is adapted to perform a multitude of fixed or flexible sequences of operations in response to program instructions. Microprocessor core 100 may conform to either CISC and/or RISC architectures to process scalar or vector data types using SISD or SIMD instructions. Microprocessor core 100 may be single-threaded or multi-threaded, i.e., capable of executing multiple sequences of program instructions in parallel. Microprocessor core 100 as further described below may, in some embodiments, comprise multiple microprocessor cores, each conforming to the same architecture or to two or more different architectures.

Microprocessor 100 is shown as including, in part, a bus interface unit 102, a fetch unit 104, an instruction cache unit 106, a memory management unit 108, a load-store unit 110, a data cache 112, execution unit 114, a multiply/divide unit (MDU) 116, a coprocessor unit 118, floating point unit (FPU) 120, and power management unit 122. While processor core 100 is described herein as including several separate components, many of these components are optional components that will not be present in each embodiment of the present invention, or are components that may be combined, for example, so that the functionality of two or more components reside within a single component. Further, in some embodiments, individual components may be divided into multiple sub-components as, for example, execution unit 114 may be divided into separate sub-units, one for arithmetic and logical operations and one for address generation. Thus, the individual components shown in FIG. 1 are illustrative and not intended to limit the present invention.

Execution unit 114, in one embodiment, implements a load-store (RISC based) architecture configured to perform single-cycle scalar integer operations (e.g. logical, shift, add, subtract, multiply, divide) and address calculations. In one embodiment, the execution unit includes general purpose registers (not shown) configured to hold data used in the performance of logic, arithmetic, and any other type of data processing functions. Execution unit 114 is coupled to fetch unit 104 and load/store unit 110.

Multiply/divide unit 116 performs multiply and divide operations for processor core 100. In one embodiment, multiply/divide unit 116 includes a pipelined multiplier, result and accumulation registers, and multiply and divide state machines, as well as all the control logic required to perform, for example, multiply, multiply-add, and divide instructions. Multiply/divide unit 116 is coupled to execution unit 114.

Floating point unit 120 interfaces with execution unit 114 and operates on non-integer data. As many applications do not require the functionality of a floating point unit, this component of processor core 100 may not be present in some embodiments of the present invention.

Coprocessor 0 (COP0) 118 performs various overhead functions for processor core 100. In one embodiment, COP0 118 is responsible for managing virtual-to-physical address translations, implementing cache protocols, for handling exception, for selecting operating modes, and for enabling/disabling interrupt functions. COP0 118 is coupled to execution unit 114.

Power management unit 122 provides a number of power management features, including low-power design features, active power management functions, and power-down modes of operation. In one embodiment, processor core 100 implements a wait instruction that signals to selected components of processor core 100 that execution or clocking should be halted, thereby reducing power consumption during idle periods. These power management features are in addition to the power saving features described herein.

Bus interface unit 102 controls external interface signals for processor core 100. Bus interface unit 102 is coupled to fetch unit 104 and load/store unit 110.

Fetch unit 104 is responsible for providing instructions to execution unit 114. In one embodiment, fetch unit 104 includes control logic for instruction cache 106. Fetch unit 104 is disposed among and coupled to execution unit 114, memory management unit 108, instruction cache 106, and bus interface unit 102.

Load/store unit (LSU) 110 is responsible for data loads and stores. In one embodiment, LSU 110 includes data cache control logic. Load/store unit 110 is coupled to data cache 112 and other memory units such as a scratch pad and/or a fill buffer. Load/store unit 110 is additionally coupled to memory management unit 108 and bus interface unit 102.

Memory management unit 108 translates virtual addresses to physical addresses for memory access. In one embodiment, memory management unit 108 includes a translation lookaside buffer (TLB). In another embodiment, MMU 108 includes multiple TLBs such as, for example, a separate instruction TLB, a separate data TLB data, and/or joint TLBs. In another embodiment, the MMU includes Fixed Mapping Translation (FMT). Memory management unit 108 is coupled to fetch unit 104, load/store unit 110, and execution unit 114.

Instruction cache 106 is an on-chip memory array organized as a multi-way set associative cache such as, for example, a 2-way set associative cache, a 4-way set associative cache, an 8-way set associative cache, and the like. In one embodiment, the tags for instruction cache 106 include a portion of the physical memory address associated with the cache line, a valid bit, an application specific ID (ASID) portion, and optional parity bits. In one embodiment, instruction cache 106 is virtually indexed and physically tagged. Instruction cache 106 is coupled to Load/store unit 110.

Data cache 112 is an on-chip memory array organized as a multi-way set associative cache. Data cache 112 is organized to include a multitude of cache lines, with each line adapted to store a copy of the data corresponding to a range of adjacent locations in a system memory (not shown). Each data cache 112 is further configured to store additional information used to manage the cache lines. Such additional information includes, for example, tag information used to identify the main memory address associated with the cache line. In one embodiment, the tags includes a portion of the physical memory address associated with the cache line, a valid bit portion, an application specific ID (ASID) portion, and optional parity bits. In another embodiment, the tags also includes a virtual address portion. In one embodiment, data cache 112 is virtually indexed and physically tagged. As described in more detail below, in accordance with the present invention, components of data cache 112 are selectively enabled and disabled to reduce the power consumption. Data cache 112 is coupled to load/store unit 110.

Figure 2B:
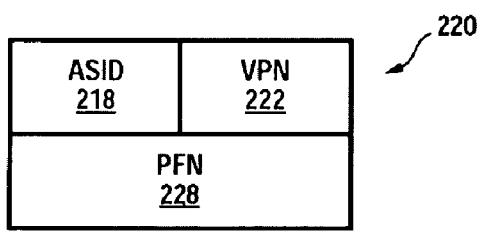
FIG. 2*b* shows the fields associated with each entry in the tag RAM of the N-way cache of FIG. 2*a*.
Figure 2C:
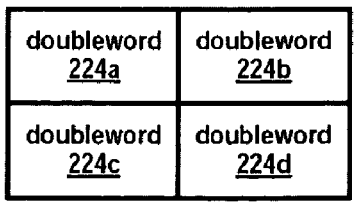
FIG. 2*c* shows the fields associated with each entry in the data RAM of the N-way cache of FIG. 2*a*.
Figure 2A:
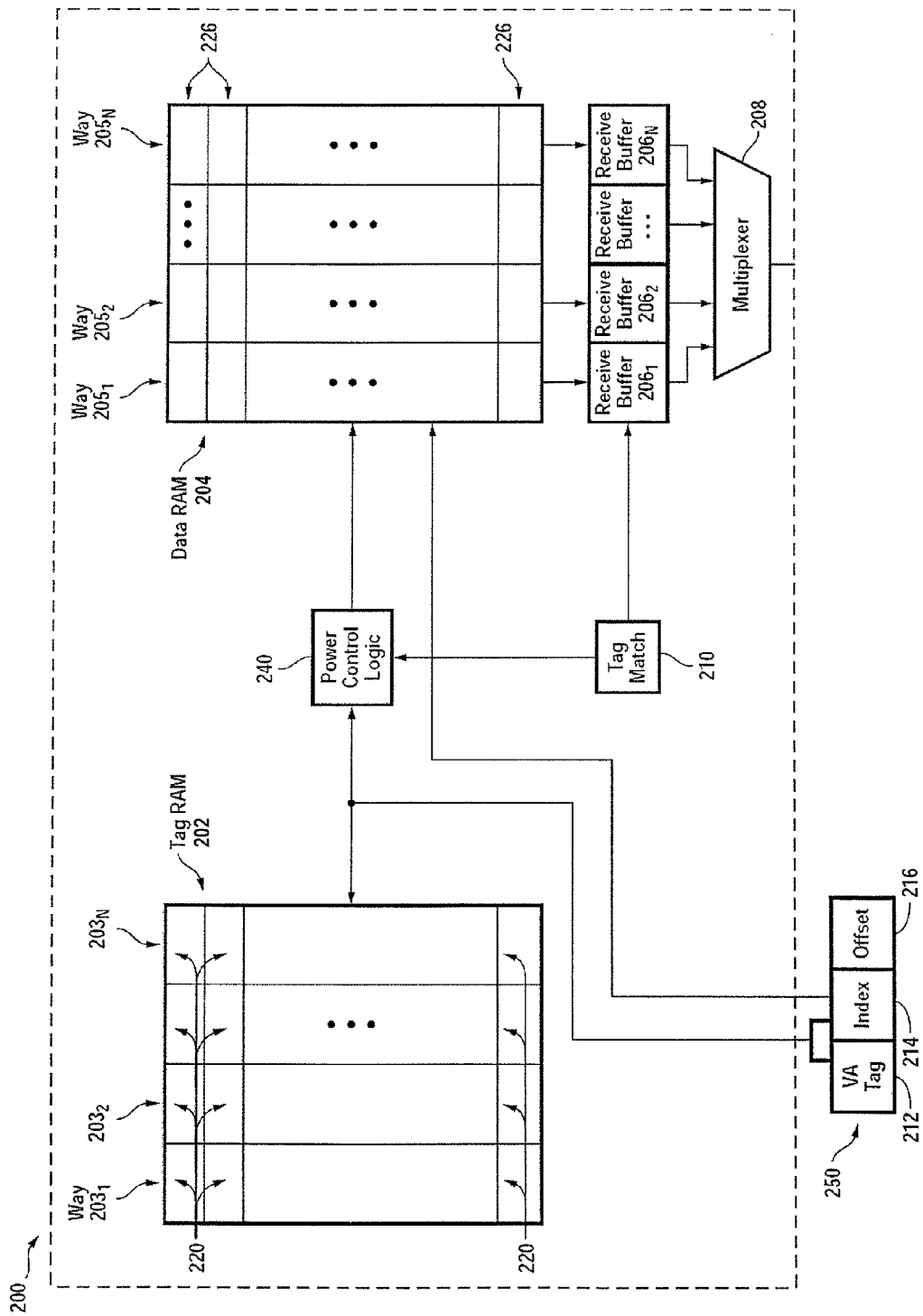
FIG. 2*a* is an exemplary block diagram of an N-way data cache in accordance with one embodiment of the present invention.

FIG. 2a is an exemplary block diagram of an N-way data cache 200, in accordance with one embodiment of the present invention. Data cache 200 is shown as including a tag RAM (Random Access Memory) 202 which includes ways $203_{1-N}$, data RAM 204 which includes ways $205_{1-N}$, receive buffers $206_{1-N}$, multiplexer 208, tag match logic 210 and power control logic 240. Receive buffers $206_{1-N}$ are configured to store data received from ways $205_1$ to $205_N$ of data RAM 204.

Information stored within tag RAM 202 and data RAM 204 are accessed using virtual address 250, as shown in FIG. 2a. Each virtual address 250 includes a tag portion 212, an index portion 214 and an offset portion 216. In one embodiment, virtual address 250 includes, for example, 32 bits where bits 31-14 represent virtual address tag 212, bits 13-5 represent index 214, and bits 4-0 represent offset 216. Tag portion 212 is delivered to tag RAM 202 and index portion 214 is delivered to data RAM 204 and to power control logic 240. Offset portion 216 is delivered to a separate logic block not shown here.

Each tag RAM 202 includes four ways $203_{1-4}$ corresponding to the ways $205_{1-4}$ of data RAM 204. Each way 203 includes a number of entries 220. As shown in FIG. 2b, in one embodiment, each tag RAM entry 220 contains multiple fields including a virtual address tag field consisting of a virtual page number (VPN) 222, an application specific ID (ASID) field 218, and a physical frame number field (PFN) 228. Each PFN 228 points to the section of main memory (DRAM) containing a copy of data present in that entry. ASID field 218 is used as a qualifier to differentiate among software programs that have been given the same virtual address by an operating system. Additional fields (not shown) such as parity fields may also be included in each entry.

Each way of data RAM 204 includes a number of entries. As shown in FIG. 2c, in one embodiment, each way 205 contains a multitude of data doublewords 224a, 224b, 224c, and 224d. Data doublewords 224a-d are copies of pairs of data words contained in the main memory address pointed to by one of the PFN tags 228 found in the tag RAM way having the same way value as the data RAM way containing the data doublewords, e.g. PFN tags in tag RAM way $203_2$ are used for data doublewords in data RAM way $205_2$.

Referring again to FIG. 2a, index 214 uniquely identifies the index lines 226 of data RAM 204. Each index line contains a set of entries, the set being all the entries at that index from all the ways. Some bits of index 214 also used to identify a set of tag RAM entries. In one implementation, all bits of index 214 are used. In other implementations, some subset of index 214 bits are used. As described further below, in one embodiment of a multi-way set associative data cache, data cache read requests use PFN 228, index 214, and offset 216 to locate the data addressed by virtual address 250.

In one embodiment, data cache 200 is configured as a 4-way set associative cache. Using a data word's virtual address, data in the cache 200 is accessed in the following way. Index 214 is used to locate index line 226 in data RAM 204. The set of data words in index line 226 so read is stored in receive buffers 206. MMU 108 effects virtual-to-physical address translation using virtual address 250. In one embodiment, virtual address tag 212 of virtual address 250 is compared to virtual page number (VPN) 222 in tag RAM 220 and ASID 218 is compared with the ASID value assigned to a software application by an operating system, the application and operating system executing on microprocessor 100. If VPN 222 matches virtual address tag 212 and the ASID values match, PFN 228 is selected. In another embodiment, only virtual address tag 212 and VPN 222 must match in order to select a PFN 228. The way number of the tag RAM way that contains the selected PFN is passed to tag match block 210.

PFN 228 obtained as described above is thereafter compared in tag match block 210 with the physical tag determined by MMU 108 determine if the two match. A cache miss is signaled by tag match block 210 if the match fails. A cache hit is signaled by tag match block 210 if the match is successful. The cache hit signal is passed to power control logic block 240. The way number previously received by tag match block 210, a number between 0 and 3 for the 4-way cache, is passed to power control logic block 240 by tag match unit 210. It is to be understood that the matched way number will be a number between 0 and N−1 for a N-way set associative cache.

Physical tag match block 210 uses the received way number to control multiplexer 208 to access the receive buffer 206 coupled to the matched way. Offset 216 bits are thereafter used to select the addressed bytes of the data in the receive buffer coupled to the selected way.

Figure 3:
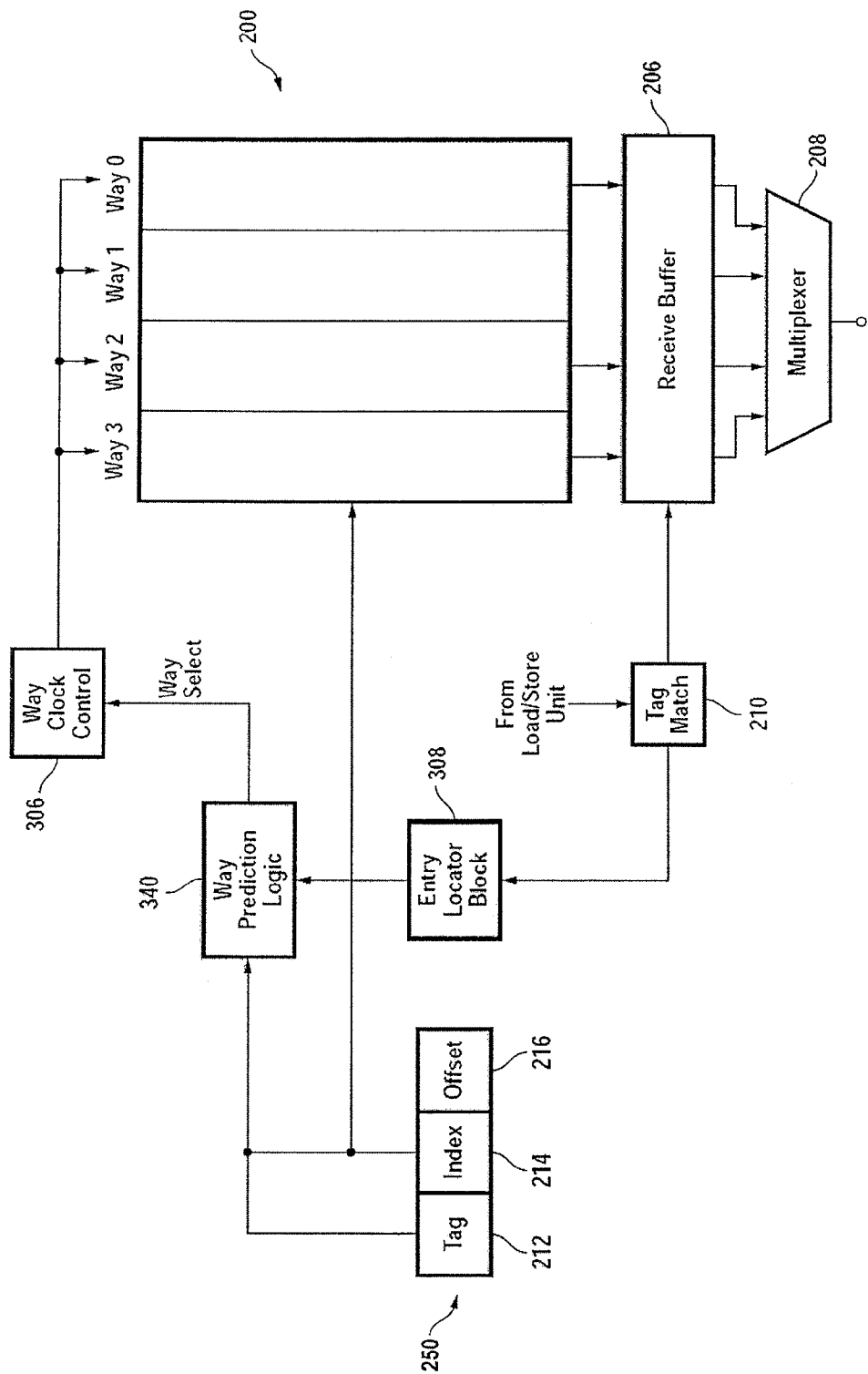
FIG. 3 is a block diagram of logic blocks controlling access to the an N-way data cache, in accordance with one embodiment of the present invention.

FIG. 3 shows way prediction logic 340, way clock control circuit 306, and entry locator logic block 308, that collectively form the power control logic 240 of FIG. 2a and that are configured to control operation of the set-associative data cache shown of FIG. 2a. In one embodiment, the data cache is a 4-way set associative data cache that may be organized into, for example, 512 index lines of 8 doublewords with 2 doublewords in each way and with each doubleword containing 8 bytes.

Way prediction logic unit 340 is configured to predict the way in cache 200 that may contain the required data and further to enable a data readout only from the predicted way. To achieve this, way control clock circuit 306 supplies an enabling signal only to the way predicted to contain the requested data. Because the remaining cache ways do not receive an enabling signal and remain disabled, power consumption is reduced when the required data is read.

Figure 4A:
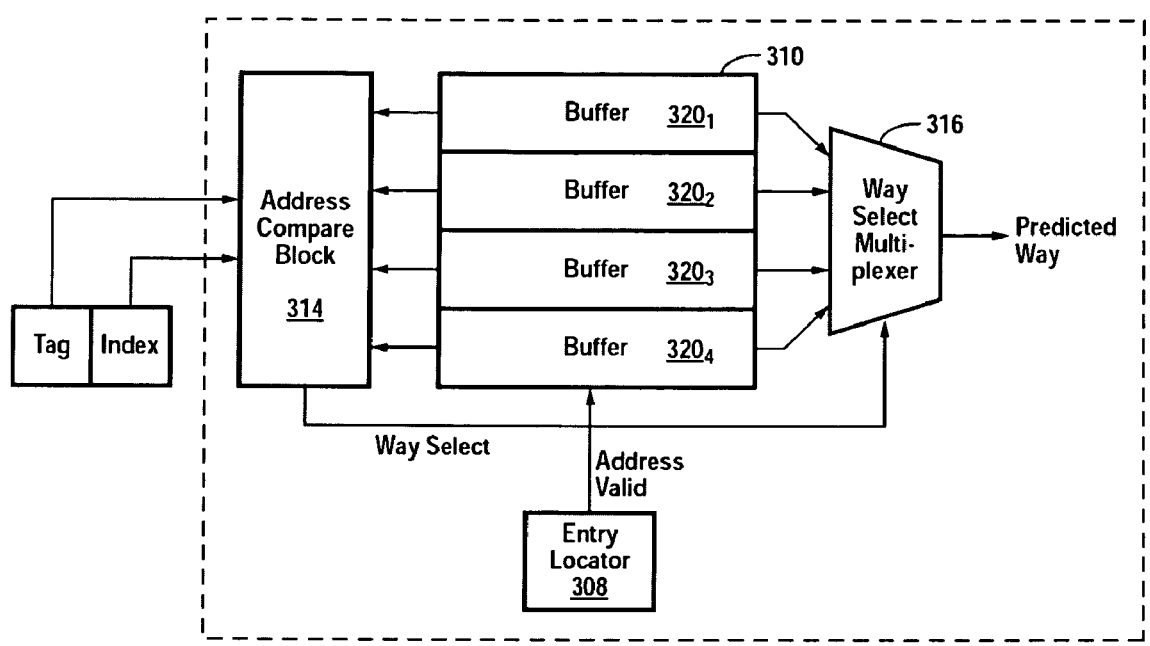
FIG. 4*a* is an exemplary block diagram of the way prediction logic unit of FIG. 3, in accordance with one embodiment of the present invention.

FIG. 4A is a block diagram of an exemplary way prediction logic 340, in accordance with one embodiment of the present invention. Exemplary embodiment 340 of way prediction logic 340 is shown as including, in part, a multi-entry associative buffer (Content Addressable Memory, hereinafter referred to as CAM) 310, an address compare block 314, an entry locator block 308, and a way select multiplexer 316. Exemplary associative buffer 310 is shown as being a 4-entry buffer, containing buffer entries $320_1$, $320_2$, $320_3$, $320_4$. It is understood that buffer 310 may be an N-entry buffer, where N is an integer greater than one.

Figure 4B:
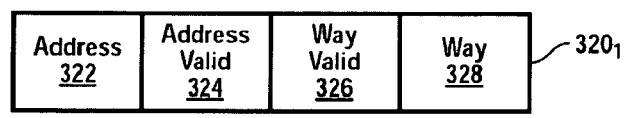
FIG. 4b is an exemplary block diagram of the way prediction array of FIG. 4a, in accordance with one embodiment of the present invention.

As shown in FIG. 4B, each buffer $320_1$, $320_2$, $320_3$, $320_4$ includes an address field 322, an address valid bit 324, a way bits 328, and a way valid bit 326. Address bits 322 include the tag bits and index bits of the virtual address of the data to be accessed in the data cache. Way bits 328 are the way bits returned by load/store unit 110 (not shown) when a hit occurs for data having a virtual address containing address bits 322. Way bits 328 are used to select the cache way predicted for the address bits. Address valid bit 324 is set whenever new address bits are stored in buffer 310, indicating that the Address bits can be used for the current prediction. In one embodiment, address valid bit 324 is cleared on power up and whenever the cache line whose index value matches the index value of the address bits associated with the way valid bit is filled or evicted. In another embodiment, address valid bit 324 is cleared on (i) power up, (ii) whenever the ASID value corresponding to the virtual address associated with the address bits change, and (iii) when the cache line whose index value matches the index value of the address bits associated with way valid bit is filled or evicted. Way bits 328 and way valid bit 326 are set when tag match block 210 receives a cache hit signal from load/store unit 110 and signals address locator block 308 that a prediction can be made the next time the address bits are matched. Address locator block 308 (FIG. 3) then matches the tag and index bits of the virtual address corresponding to the data just accessed in the data cache with address bits 322 in order to locate the entry 320 that will be updated. After the correct entry 320 has been located, that entry's predicted way bits 328 are updated and way valid bit 326 is set to indicate that a prediction can be made the next time the address bits are matched.

Referring to FIG. 3, way prediction logic 340 compares tag bits 212 and index bits 214 of a virtual address 250 with the Addresses contained in buffers entries $320_1$, $320_2$, $320_3$, $320_4$. If there is a match, the way bits associated with the matched address are output from way prediction logic 340. The prediction method advantageously prevents wrong prediction and removes the need for a recovery mechanism such as, for example, restarting the load request, since prediction is made only when a previously correct way prediction for the just matched address 322 has caused the way valid bit to be updated. In all other cases way prediction fails and all ways of the data cache are enabled. If there is a fill into or eviction from a cache line, the valid bit of any address value in the way prediction logic whose index bits match the index bits of the filled or evicted line is invalidated thus disabling power saving for that data cache index.

Figure 5:
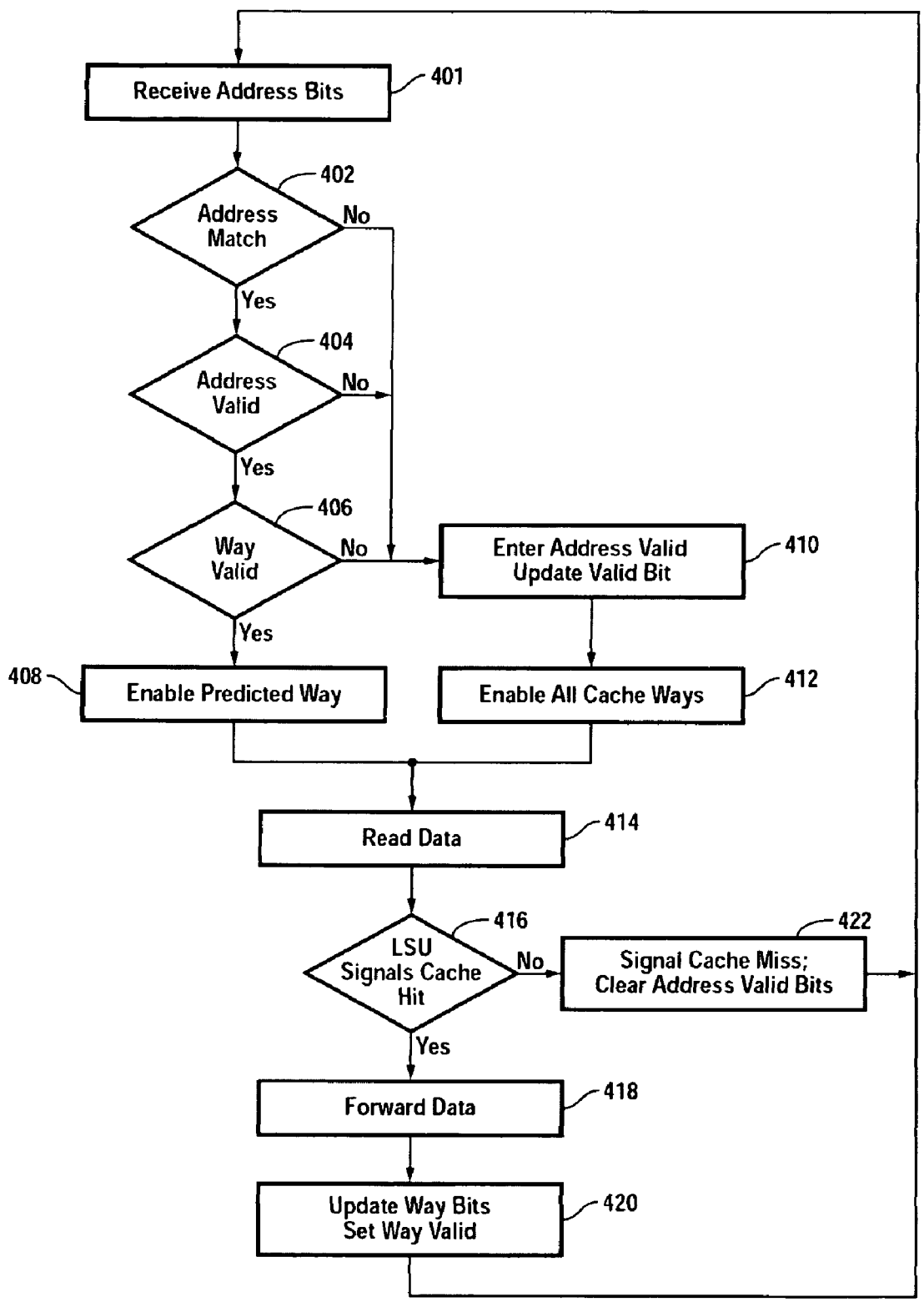

FIG. 5 is a flow chart 400 of steps used to retrieve and update address, way, and valid values of a logic prediction unit, according to one embodiment of the present invention. As shown, an address of the data to be fetched from a multi-way set-associative cache is received 401. The tag bits and index bits of the received address are compared 402 to a previous address. If a match is found, a determination is made 404 as to whether the Address Valid bit of the matched address bits indicates that the Address bits are valid. If the Address Valid bit of the matched is determined to be valid 404, a determination is made 406 as to whether the Way Valid bit associated with the matched Address are valid. If the Way Valid bit is detected as being valid, the predicted way associated with the Way Valid bit is used to enable the predicted way 408.

After the predicted way is enabled 408, the access to the data cache is completed and the requested data is read 414. If a cache hit is subsequently detected 416, the accessed data is forwarded 418 to the unit requesting the data. Thereafter, the Way Valid bit and the bits associated with the matched virtual address are updated 420 with the corresponding way bits received from the unit performing register load and store operations and way determination. The next address bits are subsequently received 401 and the process is repeated, as shown.

If no match is found during any of the steps 402, 404, and 406, the received address bits are entered into the way prediction array, using, for example, a round robin replacement technique, and the associated Address Valid bit is set 410 to indicate the new address is valid. Thereafter, all the cache ways are enabled 412. If no cache hit is detected 416 (a cache miss occurs), the Address Valid bits of all the address entries are invalidated 422. The next address bits are subsequently received 401 and the process is repeated, as shown.

Figure 6:
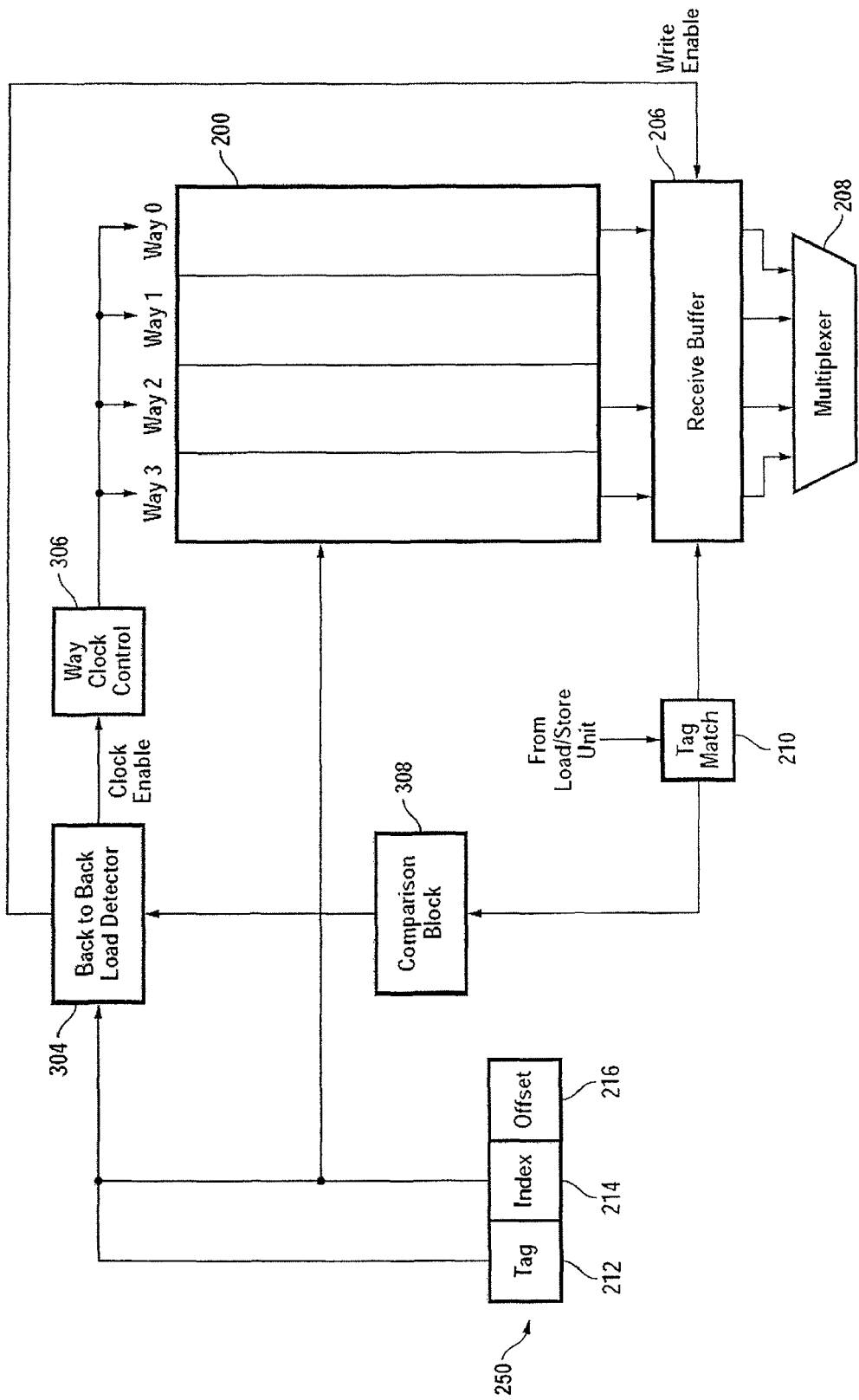
FIG. 6 shows various logic blocks configured to control the operation of an N-way cache, in accordance with another embodiment of the present invention.

FIG. 6 shows a back-to-back load detector 304, a way clock control circuit 306, and a comparison logic block 308 collectively configured to control operation of an N-way cache 200, in accordance with another embodiment of the present invention. Back-to-back detector 304 is configured to receive a virtual addresses in the same manner as described above with reference to FIG. 3. Back-to-back detector 304 is configured to determine if the load requests associated with two successive load instructions are being made to the same index line in cache 200. If the requests are being made to the same index line, the detector causes cache 200 to operate in a power saving mode, as described further below. If multiple load requests are made to the same cache line, the detector will cause cache 200 to remain in a power saving mode.

In one embodiment, cache 300 is a 4-way set associative cache that does not incorporate the predictor disclosed herein. Reference is made to FIG. 3a in the following disclosure of the detector operation. As described above, when the target of the first load instruction is in cache, the Index bits 214 of the virtual address of the said load instruction select the corresponding cache index and the cache reads out the data from that cache index and stores the selected data in receive buffers 206. Tag match block 210 causes a way to be selected using way bits signaled by load/store unit and thereafter causes the requested data to be read out of receive buffers 206 through multiplexer 208. When the detector determines that the next instruction is a load instruction, the Index bits of the virtual address of this next load instruction are compared to the Index bits of the load instruction that caused the cache line to be read out and stored in receive buffers 206. If there is a match, detector 304 determines that it is not necessary to read out the cache line again because the data now being requested is already present in receive buffers 206. Accordingly, the detector causes way clock control 306 to disable all ways of cache 300 and also disables writes into receive buffers 206, thereby placing cache 300 in a power saving state hereinafter referred to as bypass mode. In bypass mode data for the next load instruction is returned from the receive buffer without accessing any ways of the cache, resulting in a power saving.

Figure 7:
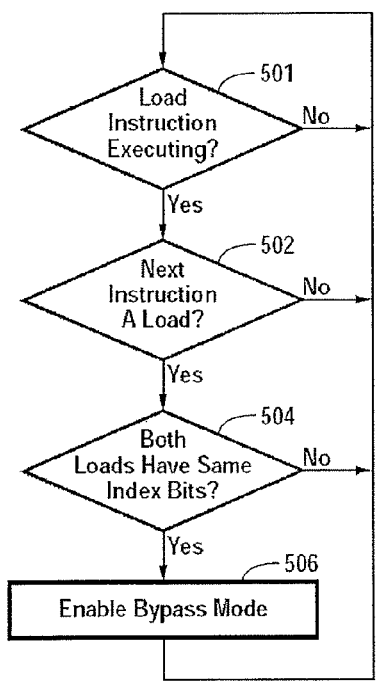
FIG. 7 is a flow chart of steps used to control the power consumption of the N-way cache shown in FIG. 6.

FIG. 7 is a flow chart 500 of steps used to retrieve data, according to another embodiment of the present invention. As shown, if it is detected that the present instruction being executed is a load instruction 501, and the instruction immediately following the present instruction is also a load instruction 502, a determination is made 504 as to whether or not the two load instructions have the same index bits. If both such instructions are determined as having the same index bits 504, the bypass mode is enabled 506 for at least one clock cycle and the process is repeated.

If it is detected that the present instruction being executed is not 501 a load instruction 501, or the instruction immediately following the present instruction is not a load instruction 502, the next instruction is received and the process is repeated. If the present and the instruction immediately following the present instructions are determined as not having the same index bits 504, the next instruction is received and the process is repeated.

Figure 8:
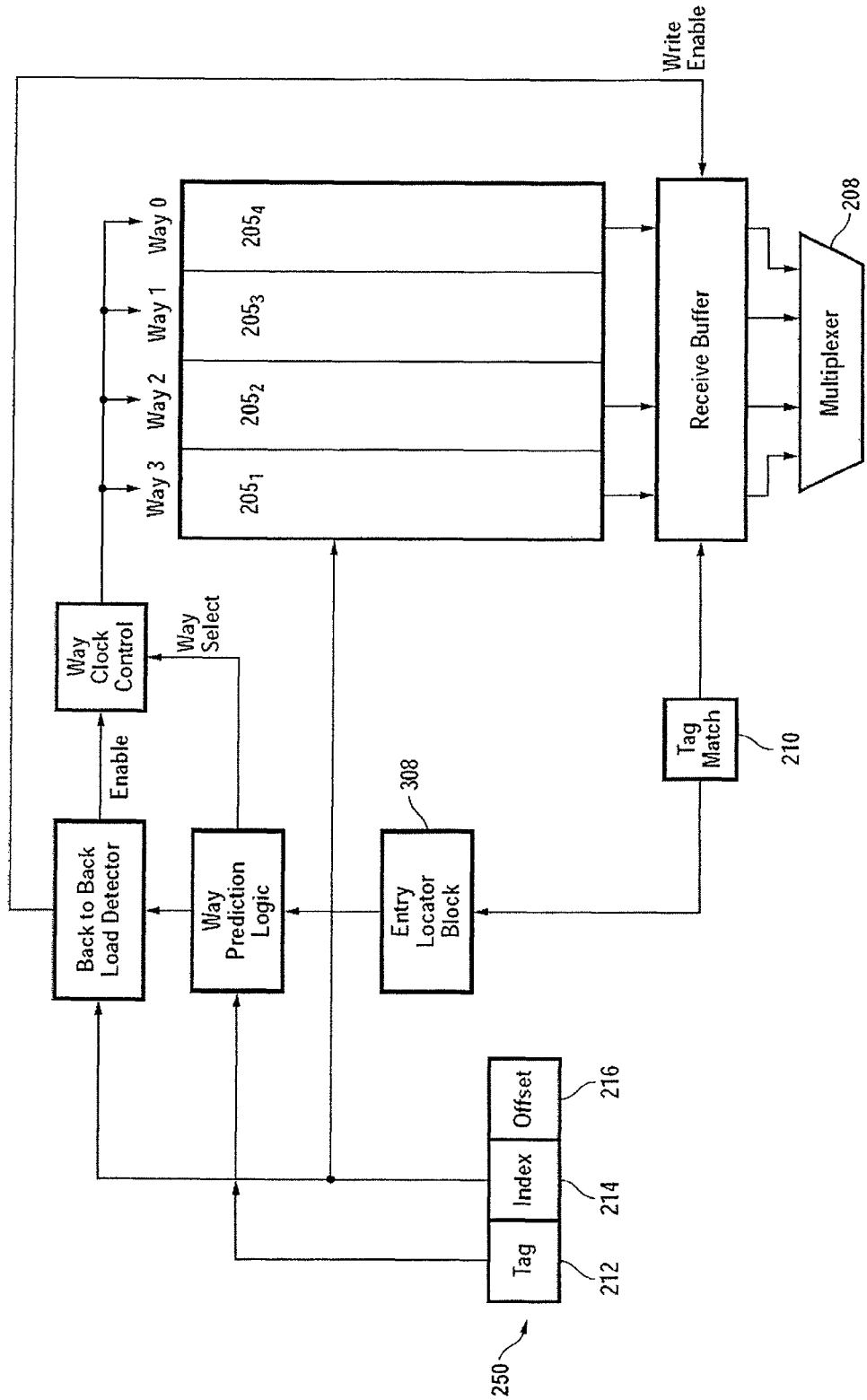
FIG. 8 shows various logic blocks configured to control the operation of an N-way cache, in accordance with another embodiment of the present invention.

FIG. 8 shows a back-to-back load detector 304 and a way clock control circuit 306, collectively configured to control operation of an N-way cache 200, in accordance with another embodiment of the present invention. Back-to-back detector 304 is configured to receive a virtual addresses in the same manner as described above with reference to FIG. 3. Back-to-back detector 304 is configured to determine if the load requests associated with two successive load instructions are being made to the same way in the same index line in cache 200. If the requests are being made to the same way in the same index line, the detector causes cache 200 to operate in a power saving mode, as described further below.

In another embodiment, cache 300 is a 4-way set associative cache that incorporates the predictor disclosed herein and is organized such that each index contains 4 doublewords with one doubleword located in each way. The predictor can be selected to be enabled or disabled. When the predictor is disabled or when way prediction fails, cache 300 operates as described when the cache does not include the predictor. When way prediction is operative and way prediction was successful, the data accessed by the first load instruction is resident in the receive buffer 206 associated with the predicted way. The contents of the remaining receive buffers are unknown and not needed. When the detector determines that the next instruction is a load instruction, the Tag and Index bits of the Virtual addresses of the two instructions are compared. If the bits match, bypass mode operation is entered.

Figure 9:
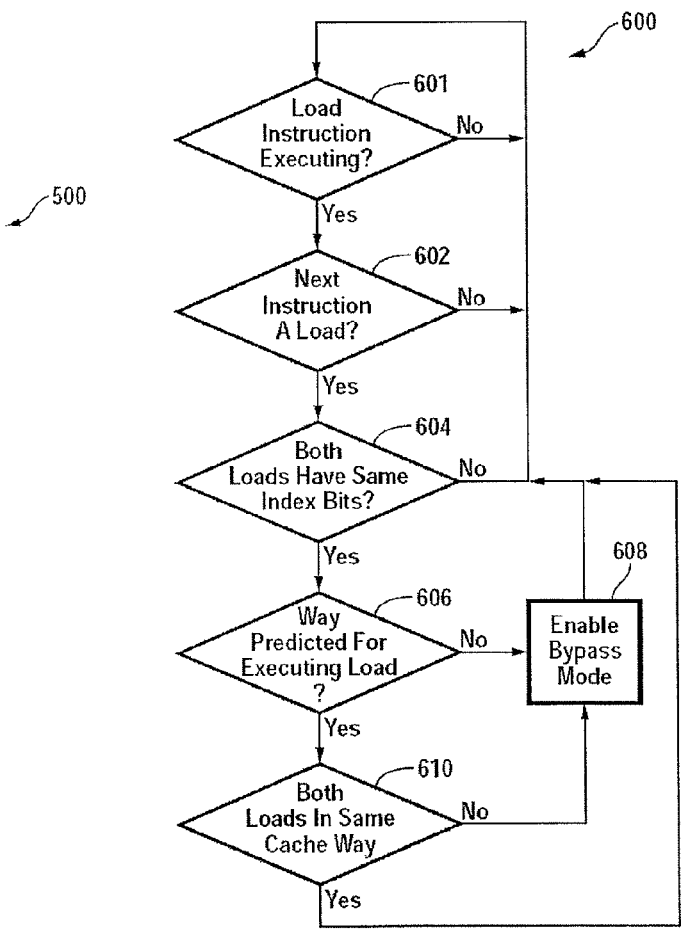
FIG. 9 is a flow chart of steps used to control the power consumption of the N-way cache shown in FIG. 8.

FIG. 9 is a flow chart 600 of steps used to retrieve data, according to another embodiment of the present invention. As shown, if it is detected that the present instruction being executed is a load instruction 601, and the instruction following the present instruction is also a load instruction 602, a determination is made 604 as to whether or not the two load instructions have the same index bits. If both such instructions are determined as having the same index bits 604, a determination is made 606 as to whether a way has been predicted for the presently executing instruction. If a way is determined 606 as having been predicted for the presently executing instruction, and it is further determined 610 that the targets of the two load instructions are in the same cache way, the bypass mode is enabled and all the cache ways are disabled 612 for at least one clock cycle.

If it is detected that the present instruction being executed is not 601 a load instruction 601, or the instruction following the present instruction is not a load instruction 602, the next instruction is received and the process is repeated. If the present and the instruction following the present instructions are determined as not having the same index bits 604, the next instruction is received and the process is repeated. If both such instructions are determined as having the same index bits 604, but no predicted way is determined as having been made 606 for the present instruction, the bypass mode is enabled and all the cache ways are disabled 612 for at least one clock cycle. The next instruction is subsequently received 601 and the process is repeated.

Figure 10:
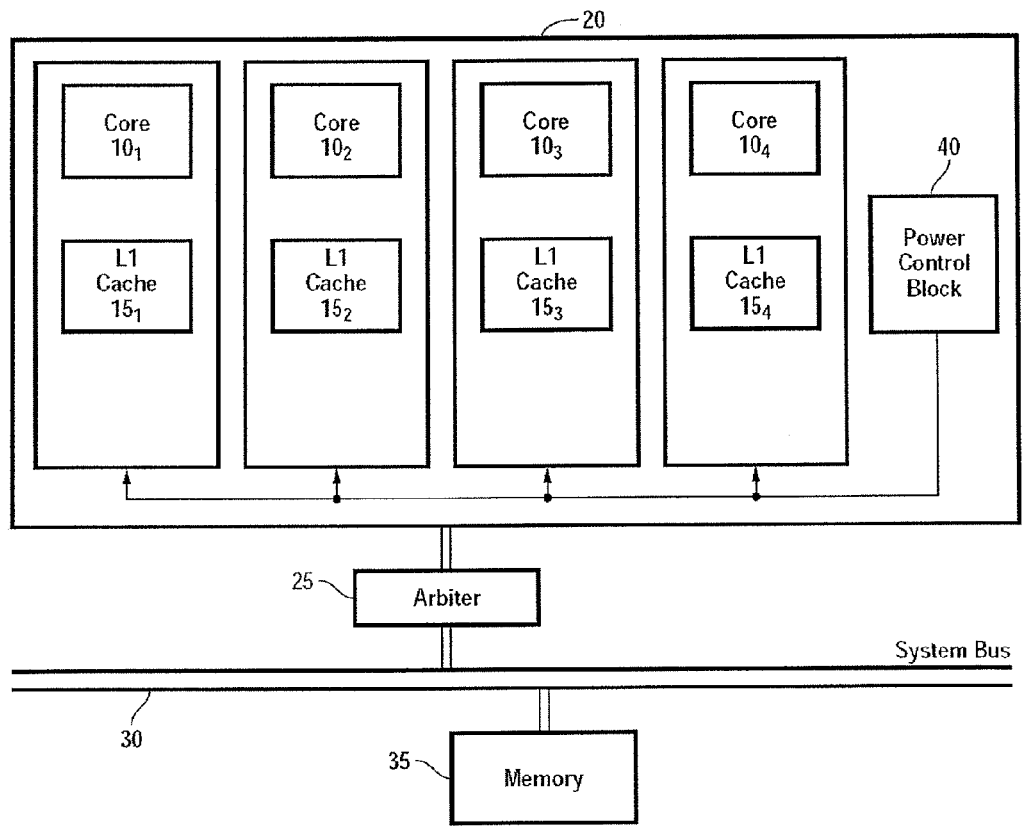
FIG. 10 is block diagram of a multi-core processor having a multitude of N-way caches, in accordance with another embodiment of the present invention.

FIG. 10 is a block diagram of a microprocessor 20 (hereinafter alternatively referred to a processor) having a power control block 40, and four independent cores $10_1, 10_2, 10_3$ and $10_4$, each having an N-way cache, in accordance with one embodiment of the present invention. Each core $10_i$ is shown as including a level-1 (L1) cache $15_i$, where i is an integer varying from 1 to 4. Power control block 40 reduces the power consumption of each N-way cache $15_i$, as described above. Assume that a data requested by core $10_1$ is not present in its L1 cache $15_1$. To gain access to this data, core $10_1$ issues a read request. Arbiter 25 receives and serializes all such read requests and transfers one of the serialized requests to cores $10_1, 10_2, 10_3$ and $10_4$ during each clock cycle. If the data associated with the read request made by core $10_1$ is detected as being present in any of the L1 caches, the requested data is transferred to cache $15_1$ from the L1 cache in which the data resides. If none of the L1 caches contain the request data, a copy of this data is retrieved from main memory 35 via system bus 30 and subsequently stored in cache $15_1$.

Figure 11:
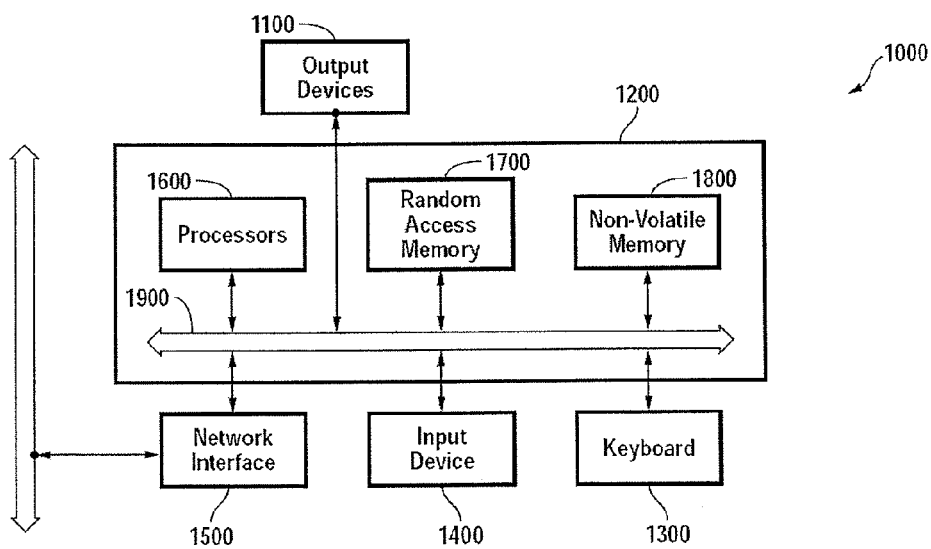
FIG. 11 illustrates an exemplary computer system 1000 in which the present invention may be embodied.

FIG. 11 illustrates an exemplary computer system 1000 in which the present invention may be embodied. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 may include a computer mouse, a trackball, joystick, track pad, graphics tablet, touch screen, microphone, various sensors, and/or other wired or wireless input devices that allow a user or the environment to interact with computer system 1000. Network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 may be a multi-processor system such as multi-processor 100 described above.

RAM 1700 and non-volatile memory 1800 are examples of tangible media for storage of data, audio/video files, computer programs, applet interpreters or compilers, virtual machines, and embodiments of the present invention described above. For example, the above described embodiments of the processors of the present invention may be represented as human-readable or computer-usable programs and data files that enable the design, description, modeling, simulation, testing, integration, and/or fabrication of integrated circuits and/or computer systems. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the present invention may use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, and so on. Such software can be disposed in any known computer usable medium including semiconductor, magnetic disk, or optical disk (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over communication networks including the Internet and intranets.

It is understood that the apparatus and methods described herein may be included in a semiconductor intellectual property core, such as a microprocessor core (e.g. expressed as a hardware description language description or a synthesized netlist) and transformed to hardware in the production of integrated circuits. Additionally, the embodiments of the present invention may be implemented using combinations of hardware and software, including micro-code suitable for execution within a processor.

The above embodiments of the present invention are illustrative and not limitative. Various alternatives and equivalents are possible. The invention is not limited by the type of integrated circuit in which the present disclosure may be disposed. Nor is the invention limited to any specific type of process technology, e.g., CMOS, Bipolar, BICMOS, or otherwise, that may be used to manufacture the various embodiments of the present invention. Other additions, subtractions or modifications are obvious in view of the present invention and are intended to fall within the scope of the appended claims.

What is claimed is:

1. A microprocessor comprising:
an N-way cache, N being an integer greater than one; and
a way prediction logic configured to receive an address and predict a first one of the N cache ways in which data associated with the address is likely to be stored; said way prediction logic further configured to supply an enabling signal to said predicted first one of the N cache ways, said way prediction logic further configured not to supply the enabling signal to a remaining (N−1) of the cache ways wherein said way prediction logic comprises:
a way prediction array having a plurality of entries, each entry in the array configured to store data representative of an address identifying a cache entry, data representative of a cache way, and one or more validation bits, wherein at least one of the validation bits is associated with the data representative of the cache way; and
a way prediction control unit configured to compare one or more bits of the received address with one or more bits of each of the addresses stored in the array to detect an address match, said way prediction control unit configured to generate the enabling signal in accordance with the detected address match and further in accordance with the stored validation bits wherein said way prediction logic is further configured to update the data representative of the cache way and the one or more validation bits in the way prediction array when a cache hit is detected.

2. The microprocessor of claim 1 wherein said way prediction logic is further configured to update the data representative of the address identifying the cache entry and the one or more validation bits in the way prediction array when no match in the addresses is detected.

3. The microprocessor of claim 1 wherein said way prediction logic is further configured to update the data representative of the address identifying the cache entry and the one or more validation bits in the way prediction array when the addresses are detected as being matched and one or more validation bits associated with the received address indicate that the data stored in the matched cache way is invalid.

4. The microprocessor of claim 1 wherein the received address is a virtual address.

5. The microprocessor of claim 1 wherein the microprocessor comprises a plurality of processing cores, each processing core comprising an N-way cache.

6. The microprocessor of claim 1 wherein the way prediction array is a Content Addressable Memory (CAM), said way prediction logic being further configured to flush at least one of the address validation bits stored in the CAM during a first clock cycle.

7. The microprocessor of claim 1 wherein the way prediction array is a Content Addressable Memory (CAM), said way prediction logic being further configured to flush all of the address validation bits stored in the CAM during a first clock cycle.

8. The microprocessor of claim 1 wherein said N-way cache is a data cache.

9. A method of operating a microprocessor comprising an N-way cache, the method comprising:
 predicting a first one of the N cache ways in which data associated with a received address is likely to be stored;
 supplying an enabling signal to said predicted first one of the N cache ways;
 not supplying the enabling signal to a remaining (N−1) of the cache ways;
 storing a plurality of entries, each entry comprising an address identifying a cache entry, data representative of a cache way, and one or more validation bits, wherein at least one of the validation bits is associated with the data representative of the cache way;
 comparing one or more bits of the received address with one or more bits of the stored addresses to detect an address match;
 generating the enabling signal in accordance with the detected address match and further in accordance with the stored validation bits; and
 updating at least one of the plurality of entries with the data representative of the cache way and the one or more validation bits when a cache hit is detected.

10. The method of claim 9 further comprising:
 updating at least one of the plurality of entries with the address identifying the cache entry and the one or more validation bits when no match in the addresses is detected.

11. The method of claim 9 further comprising:
 updating at least one of the plurality of entries with the address identifying the cache entry and the one or more validation bits when an address match is detected and one or more validation bits associated with the received address indicate that the data stored in the matched cache way is invalid.

12. The method of claim 9 wherein the received address is a virtual address.

13. The method of claim 9 wherein said N-way cache is associated with one of a plurality of processing cores of a microprocessor.

14. The method of claim 9 wherein said plurality of entries are stored in a Content Addressable Memory (CAM), the method further comprising:
 flushing at least one of the address validation bits stored in the CAM during a first clock cycle.

15. The method of claim 9 wherein said plurality of entries are stored in a Content Addressable Memory (CAM), the method further comprising:
 flushing all of the address validation bits stored in the CAM during a first clock cycle.

16. The method of claim 9 wherein said N-way cache is a data cache.

17. A non-transitory computer readable storage medium including instructions defining logic blocks of a microprocessor comprising an N-way cache, the computer readable medium adapted for use by an electronic design automation application executed by a computer, wherein the logic blocks are configured to perform an operation comprising:
 predicting a first one of the N cache ways in which data associated with a received address is likely to be stored;
 supplying an enabling signal to said predicted first one of the N cache ways;
 not supplying the enabling signal to a remaining (N−1) of the cache ways;
 storing a plurality of entries, each entry comprising an address identifying a cache entry, data representative of a cache way, and one or more validation bits, wherein at least one of the validation bits is associated with the data representative of the cache way;
 comparing one or more bits of the received address with one or more bits of the stored addresses to detect an address match;
 generating the enabling signal in accordance with the detected address match and further in accordance with the stored validation bits; and
 updating at least one of the plurality entries with the data representative of the cache way and the one or more validation bits when a cache hit is detected and subsequent to the generation of the enabling signal.

18. The non-transitory computer readable storage medium of claim 17 wherein the logic blocks are further configured to perform an operation comprising:
 updating at least one of the plurality entries with the address identifying the cache entry and the one or more validation bits when no match in the addresses is detected.

19. The non-transitory computer readable storage medium of claim 17 wherein the logic blocks are further configured to perform an operation comprising:
 updating at least one of the plurality entries with the address identifying the cache entry and the one or more validation bits when an address match is detected and one or more validation bits associated with the received address indicate that the data stored in the matched cache way is invalid.

20. The non-transitory computer readable storage medium of claim 17 wherein the received address is a virtual address.

21. The non-transitory computer readable storage medium of claim 17 wherein said N-way cache is associated with one of a plurality of processing cores of a microprocessor.

22. The non-transitory computer readable storage medium of claim 17 wherein said plurality of entries are stored in a Content Addressable Memory (CAM), wherein the logic blocks are further configured to perform an operation comprising:
 flushing at least one of the address validation bits stored in the CAM during a first clock cycle.

23. The non-transitory computer readable storage medium of claim 17 wherein said plurality of entries are stored in a Content Addressable Memory (CAM), wherein the logic blocks are further configured to perform an operation comprising:
 flushing all of the address validation bits stored in the CAM during a first clock cycle.

24. The non-transitory computer readable storage medium of claim 17 wherein said N-way cache is a data cache.

* * * * *